US008418775B2

(12) United States Patent
Blomet et al.

(10) Patent No.: US 8,418,775 B2
(45) Date of Patent: Apr. 16, 2013

(54) LOW-PRESSURE FLOW-CONTROLLED POWDER SPREADER

(75) Inventors: Joel Blomet, Valmondois (FR); Patrick Beriou, Genas (FR)

(73) Assignee: Prevor International, Paris (FR)

( * ) Notice: Subject to any disclaimer, the term of this patent is extended or adjusted under 35 U.S.C. 154(b) by 825 days.

(21) Appl. No.: 11/718,145

(22) PCT Filed: Oct. 27, 2005

(86) PCT No.: PCT/FR2005/002697

§ 371 (c)(1),
(2), (4) Date: Nov. 13, 2007

(87) PCT Pub. No.: WO2006/048536

PCT Pub. Date: May 11, 2006

(65) Prior Publication Data

US 2009/0145982 A1 Jun. 11, 2009

(30) Foreign Application Priority Data

Oct. 29, 2004 (FR) ..................................... 04 11599

(51) Int. Cl.
*A62C 35/58* (2006.01)
*A01C 3/06* (2006.01)
*A01C 7/08* (2006.01)
*A01C 15/00* (2006.01)
*B05B 7/30* (2006.01)

(52) U.S. Cl.
USPC ................ 169/88; 169/77; 239/347; 239/650

(58) Field of Classification Search .................. 239/347, 239/650, 654, 525, 526, 632; 169/30, 71, 169/77, 85, 88
See application file for complete search history.

(56) References Cited

U.S. PATENT DOCUMENTS

| | | | | |
|---|---|---|---|---|
| 3,251,420 | A * | 5/1966 | Rodgers | 169/77 |
| 3,814,329 | A * | 6/1974 | Clark | 239/426 |
| 3,858,659 | A * | 1/1975 | Fukushima | 169/77 |
| 5,159,955 | A * | 11/1992 | Ekman | 137/614.03 |
| 5,368,237 | A * | 11/1994 | Fulkerson | 239/706 |
| 5,988,527 | A * | 11/1999 | Alosi | 239/124 |
| 2004/0251327 | A1* | 12/2004 | Messerly et al. | 239/690.1 |
| 2007/0063077 | A1* | 3/2007 | Keudell et al. | 239/690 |

FOREIGN PATENT DOCUMENTS

| | | | |
|---|---|---|---|
| FR | 2421632 | | 11/1979 |
| FR | 2517211 | * | 6/1986 |

* cited by examiner

*Primary Examiner* — Len Tran
*Assistant Examiner* — Justin Jonaitis
(74) *Attorney, Agent, or Firm* — Patzik, Frank & Samotny Ltd.

(57) ABSTRACT

The invention relates to a powder spreader device including a sealed tank (1) with a tapered bottom wall (5), a vessel (2) containing a pressurised spray gas connected to the tank (1) via a feed line (27), control means (20) connected to the vessel (1), and a powder dispensing nozzle (10) connected to the tank, wherein the elongate nozzle (10) includes at least two pressure relief stages (11, 12) for breaking up the dispensed powder jet and forming a uniform and homogenous jet with a relatively low flow rate.

12 Claims, 5 Drawing Sheets

LOW-PRESSURE FLOW-CONTROLLED POWDER SPREADER

The present invention relates to improvements made to powder spreaders. More specifically, the invention relates to spreaders intended to combat accidental spillages of chemical products that are dangerous to man or to the environment.

Numerous known powder spreaders (particularly dry powder extinguishers) are currently in existence. These are used in particular for neutralizing chemical products on the ground, such as fuels, oils, acids, bases or other harmful chemical products. A powder tailored to the requirements is thus spread over the product in order to absorb it, and at least neutralize it. However, most known powder spreaders are unable to spread a continuous and controlled jet of the powder, which means that there is a risk that the chemical spillage will be splashed dangerously when a large amount of powder expelled at high velocity strikes it.

In order to alleviate this disadvantage and ensure that the powder is expelled at a lower velocity and homogeneously, certain spreaders propose a pressure regulator, which is an expensive additional item for such products.

Document FR 2 517 211 in particular discloses a powder spreader comprising a sealed tank with a conical base, a vessel containing a pressurized gas that is dispatched into the tank via appropriate pipework by actuating a lever handle located on the top of the tank, and flexible tubing ending in a nozzle at its free end and intended for spreading the powder. Also of note are the presence of a valve located in close proximity to the nozzle so as to control the start and end of the spreading of the powder. In order to control the way the outlet pressure changes during spreading, the vessel containing a pressurized gas is positioned outside the tank and has a pressure reducer and runs of pipework leading the pressurized gas to an end situated level with the axis of the conical bottom of the sealed tank. While this spreader is able to avoid any risk of plugging at the base of the tank by virtue of the combination of the cone and of the free end at which the pressurized gas arrives, it does, however, entail an expensive pressure reducer to act as a pressure regulator.

It is an object of the present invention to propose an inexpensive powder spreader capable of emitting a controlled jet of powder and which is thus able to alleviate the problems encountered in known powder spreaders.

To this end, the invention proposes a powder-spreading device comprising a sealed tank with a conical bottom, a vessel containing a pressurized spray gas connected by a line to the volume of the tank, control means associated with the vessel and a powder-spreading nozzle connected to the tank, in which device the nozzle, of elongate shape, comprises a straight channel extending therethrough and at least two pressure-reducing stages able to break up the jet of powder emitted in order to form a uniform and homogeneous jet of relatively low velocity.

Thus, the elongate nozzle, by virtue of its two pressure-reducing stages, makes it possible to achieve a sufficient decrease in the pressure up to the exit of the nozzle. The powder velocity is thus controlled, making it possible to obtain a "gentle" and continuous jet (without any variation in flow rate) without in any way needing to resort to a pressure reducer.

In an additional embodiment, the nozzle is connected to the tank via tubing with the interposition of an air gun able to instigate the spreading of the powder.

Thus, the user can hold the spreader in one hand and the nozzle in the other. The air gun allows him to act directly on the exit of powder from the nozzle. In an additional embodiment, the air gun comprises a first valve to allow the powder to pass through the air gun, and a control for controlling this first valve.

Thus, the handgrip acts directly on the valve which, as it opens, has the pressurized powder passing through it.

In another additional embodiment, the first pressure-reducing stage of the nozzle provides the interface with the air gun and comprises a substantially tubular coupling of which the part intended to be inserted into the nozzle comprises a cylinder shape pierced with at least two holes in its main section and blanked off at its free end in order to force the powder to enter the nozzle via the holes.

This first coupling provides a first pressure drop and plays a part in leading the powder toward the elongate nozzle and performs a first realigning of the powder jet.

In another additional embodiment, the second pressure-reducing stage is located near the free end of the elongate nozzle and comprises a transverse wall pierced with a slot-shaped orifice.

This second coupling is able to create an additional pressure drop, and the slot ensures very gentle and uniform dissemination of the powder, in the form of a jet that is substantially flat as it leaves the nozzle, and of a spread that varies according to the dimensions of the slot.

Other features and advantages of the invention will become further apparent from reading the description which will follow. This description is purely illustrative and is to be read in conjunction with the attached drawings in which.

Figure 1:
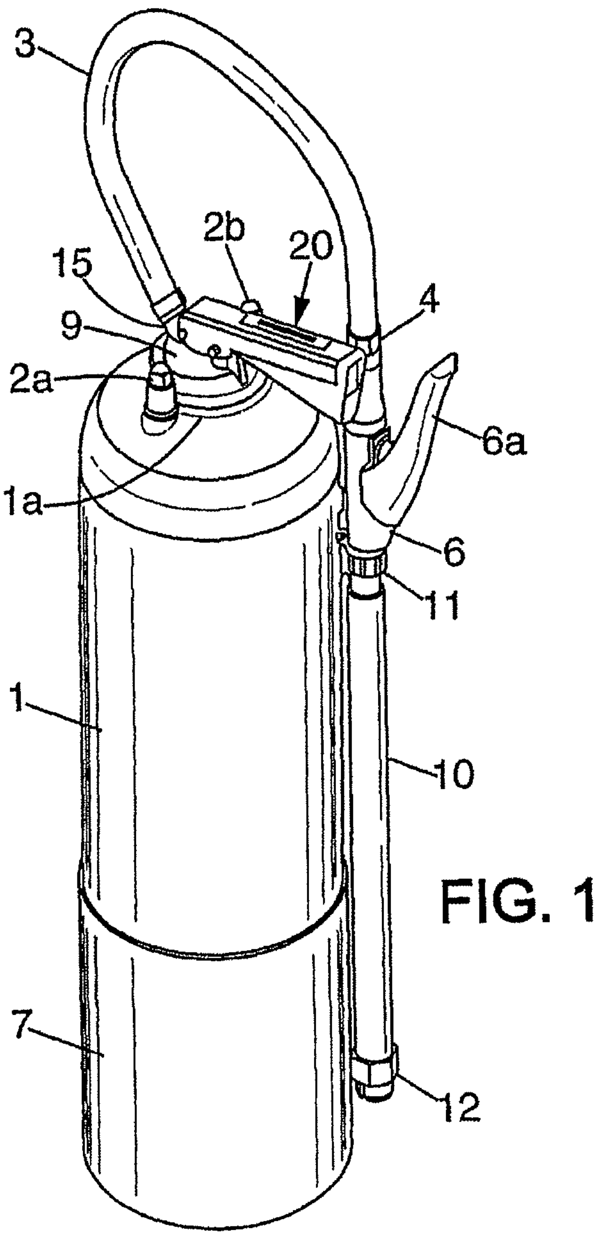
FIG. 1 is a general arrangement of a powder spreader according to the invention.
Figure 2:
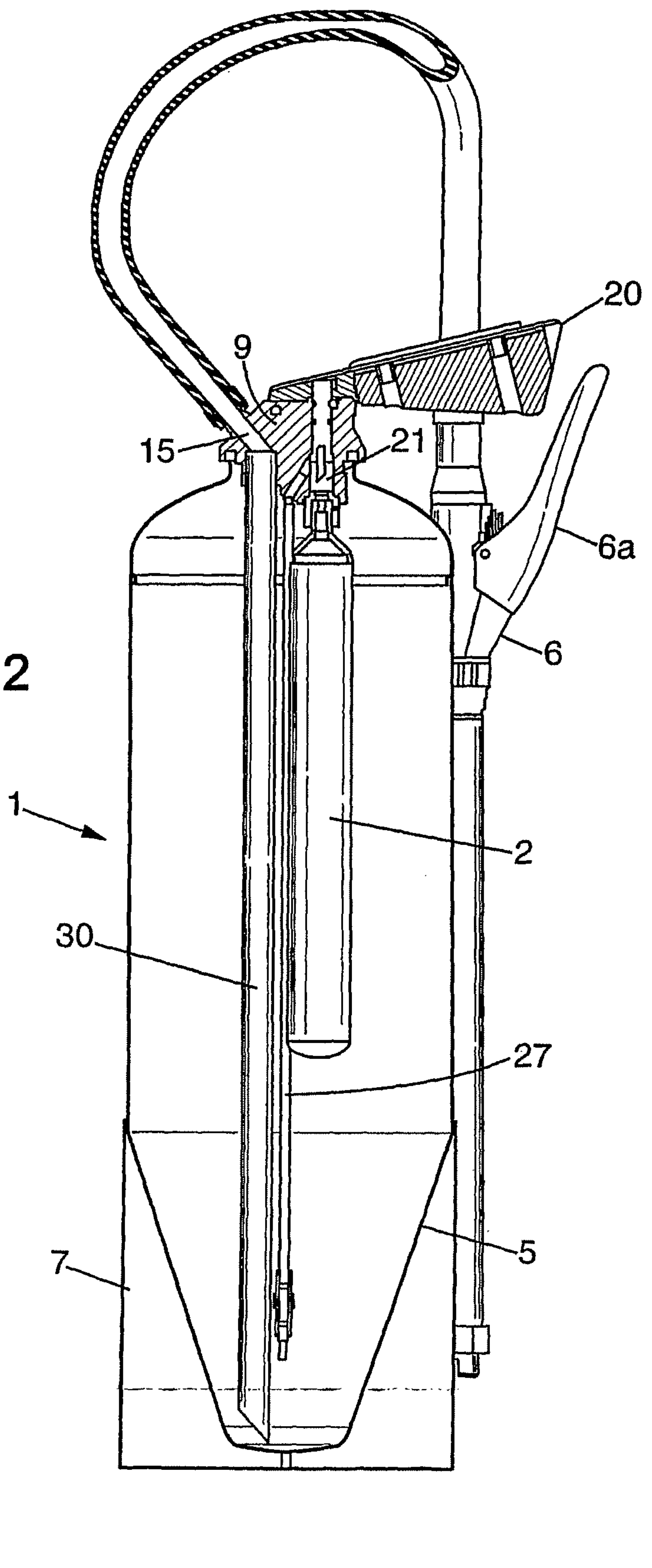
FIG. 2 is a sectioned view of the tank of the powder spreader according to the invention.

A general arrangement and a vertical section through a powder spreader according to the invention can be seen in FIGS. 1 and 2 respectively. The spreader comprises a tank 1 which is closed at its base by an external skirt 7 which extends the cylindrical part of the tank 1. This tank also comprises, at its top, an opening la sealed off by a head 9 (tightened down using bolts 2*a* and 2*b*). This head 9 also bears control means 20 in the form of a lever handle allowing a vessel 2 containing a pressurized spray gas (not depicted in FIG. 1) to be struck through the head 9. The striking (that is to say the puncturing) of the vessel 2 releases the gas through the moving of the valve 21. This spray gas is thus dispatched into the tank to pressurize it and thus encourage the powder to leave the tank and be spread. In another embodiment, as in document FR 2 517 211, the vessel of pressurized gas may be located outside the tank 1. In both instances, the vessel 2 is connected to the volume of the tank 1 by a line.

The head also bears a tube insert 15 though which the powder leaves the tank when the tank is pressurized. This tube insert 15 is connected to tubing 3 in a sealed manner. The nozzle 10 is connected to the tank 1 via the tubing 3, with the interposition of an air gun for operating the spreader. The tubing 3 is connected to the air gun 6 by a sealed coupling 4. The air gun 6 comprises a control, depicted in the form of a handgrip 6*a* in FIGS. 1 and 2, and allows for the opening of another valve (not depicted) which thus allows the powder to begin to leave the nozzle, once the user has operated the control. The valves of the powder-spreading device according to the invention may advantageously be replaced by controlled gates for the control means 20 and the control 6*a* respectively.

The air gun 6 is also connected to a nozzle 10 of elongate shape comprising a straight channel 14 extending therethrough and, at each of its ends, couplings 11 and 12 which reduce the pressure of the powder as it passes through them. A first coupling 11 provides the interface between the air gun 6 and the elongate nozzle 10. This first pressure-reducing stage constitutes a first pressure drop for the powder jet passing through it and realigns this jet. The second pressure-reducing stage 12 imposes a second pressure drop on the powder jet passing through it and thus makes it possible to obtain, at the exit of the elongate nozzle 10, a jet at a controlled rate, with the powder being discharged very gently.

A cross section through the tank is depicted in FIG. 2. Actuation of the control means 20 by the head 9 lifts the valve 21 that keeps the vessel 2 closed. Once the valve is lifted, the pressurized spray gas can escape from the vessel 2 and flow through the line 27 to the conical bottom 5 of the tank.

In order to avoid any risk of plugging at the base of the tank, the combination of the conical bottom 5 and of the pressurized gas delivery line 27 from document FR 2 517 211 is retained. Thus, at its lower part, the tank has a conical bottom 5 onto the outside of which is screwed an external skirt 7 that enables the unit to present a flat bottom.

The pressurized gas may be nitrogen or argon or any other gas appropriate for powder spreaders. The gas thus disseminated from the vessel 2 exits the lower end of the line 27 into the middle of the conical bottom 5 of the tank 1. Because the bottom of the tank is conical, there are only very slight risks that the powder will adhere to the walls of the tank. The conical bottom 5 thus constitutes a central funnel around the free end of the line 27 that disseminates the pressurized gas. The presence of the end of the line 27 in the middle of the conical bottom 5 leads to a continuous action of the gas both in the direction of the side walls of the conical bottom 5 and in the direction of its lower part where the inlet to the siphon tube 30 is positioned, which means that all of the powder contained in the tank is expelled from the tank even if the powder has settled down or formed a plug beforehand.

The powder thus expelled by the pressurized gas enters the lower end of the siphon tube 30 also located in the lower part of the conical bottom 5 and is directed toward the tank outlet tube insert 15 via the siphon tube 30. The siphon tube 30 is in fact fixed at its top to the tube insert 15 that passes through the head 9.

The powder thus expelled can then reach the tubing 3 connected in a sealed fashion to the outlet tube insert 15.

In a preferred embodiment, tubing 3 provides the connection between the outlet from the tank 1 and the air gun 6. In this case, the nozzle is coupled to the tank 1 via tubing, which may or may not be flexible, with the interposition of an air gun 6. This air gun 6 is able to allow the powder to pass. For this purpose it comprises a first valve and a control in the form of a lever handle 6*a* in the example of FIG. 1 and which allows the spreading of the powder to be instigated.

In another embodiment, the air gun 6 and the nozzle 10 may be connected directly to the outlet of the tank 1.

Figure 3:
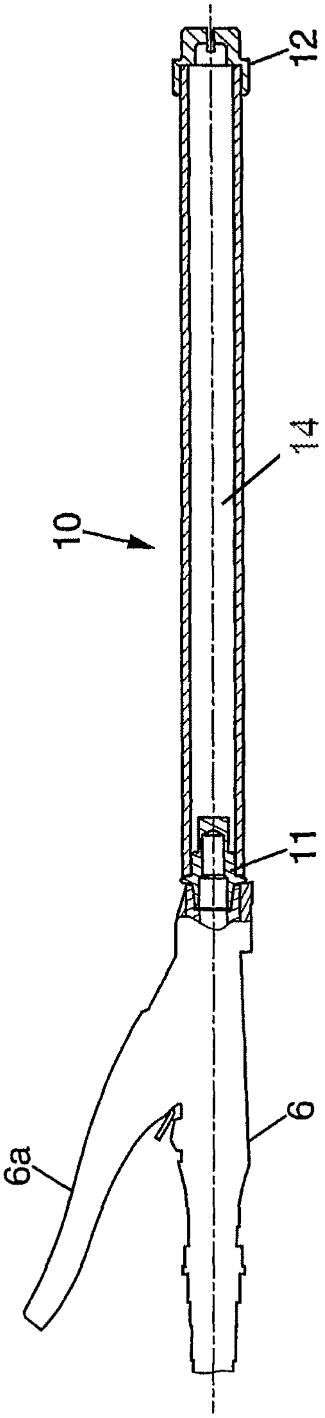
FIG. 3 is a view of the air gun and of the elongate nozzle.

FIG. 3 shows a general arrangement of the air gun 6 equipped with its control 6*a* and with the elongate nozzle 10 comprising the first pressure-reducing stage 11 and the second pressure-reducing stage 12.

Figure 4:
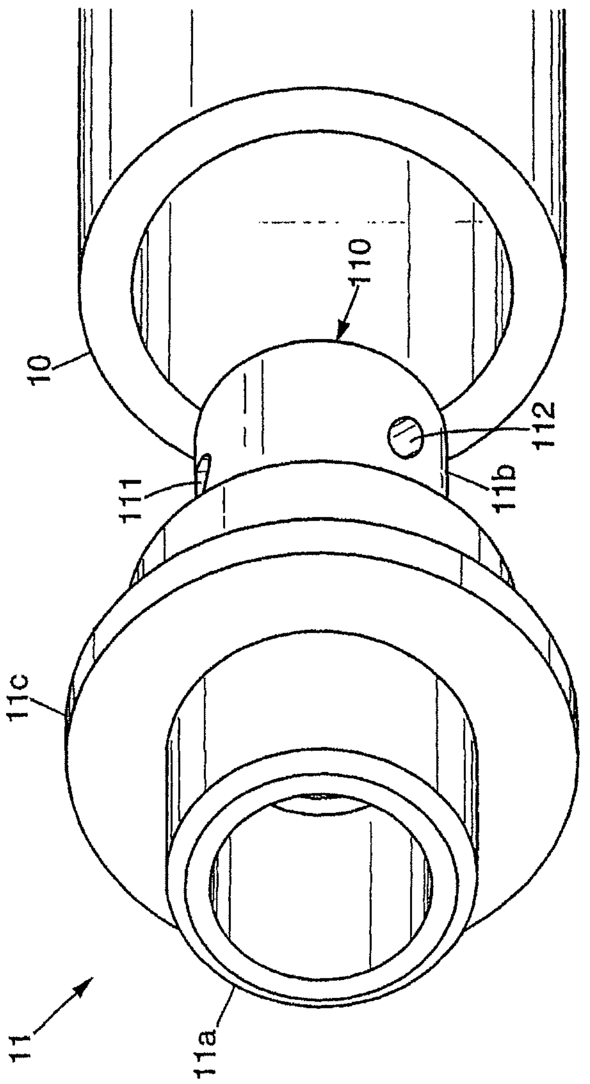
FIG. 4 is a view of the first pressure-reducing stage.

The first pressure-reducing stage 11 of the nozzle 10 provides the interface with the air gun. It is designed in the form of a coupling between the air gun 6 and the nozzle 10, and depicted in FIG. 4. This first pressure-reducing stage is intended to break the powder jet leaving the air gun 6 and provides a first reduction in pressure. This first pressure-reducing stage is in the form of a coupling 11 of substantially tubular shape. In the preferred embodiment depicted in FIG. 4, this coupling 11 is in the form of two cylinders 11*a* and 11*b* of first and second outside diameters respectively, connected to one another by a ring 11*c* of greater diameter. The first cylinder 11*a* is intended to collaborate with the air gun 6 while the second cylinder 11*b* is intended to collaborate with the nozzle 10, the ring 11*c* being interposed between the air gun 6 and the nozzle 10. The two cylinders 11*a* and 11*b*, together with the ring 11*c*, are hollowed in their central part in order to allow the powder to pass. In a preferred embodiment, the free end (which lies inside the nozzle) of the cylinder 11*b* is blanked off. The main section of this cylinder is pierced with at least two perpendicular though-holes 111 and 112, (thus constituting openings for the passage of the powder) which are preferably round with diameters of 2 to 4 mm, and preferably of 2.5 to 3.5 mm. This closed end 110, the thickness of which ranges between less than 1 mm and a few mm, acts as a direct obstacle to the propagation of the powder. It thus allows the powder to be forced to pass through the openings 111 and 112 and affords better pressure reduction. These two openings also enable the powder to be forced to pass into the space between the cylinder 11*b* and the internal wall of the nozzle, spraying the powder through the holes 111 and 112 directly toward the internal wall and in a centripetal direction with respect to the main direction of propagation. The power of the jet is thus broken by virtue of the jet's being redirected toward the internal walls of the nozzle. These two openings may preferably be diametrically opposed on the cylinder 11*b*. It is also possible to anticipate another distribution of the openings, particularly when more than two openings are envisioned.

The powder is thus sprayed and guided along the internal walls of the nozzle 10, having left the coupling 11 by the two openings 111 and 112. The nozzle has to be long enough to allow the powder jet to be straightened again. Its length ranges between 100 mm and 500 mm, and preferably ranges between 150 mm and 350 mm. It has an internal diameter ranging between 10 and 30 mm and an external diameter ranging between 15 and 35 mm; as a preference, its internal diameter is 20 mm and its external diameter is 25 mm. In a preferred embodiment, it is made of PCV, and the couplings 11 and 12 are made of brass. However, other materials may be envisioned.

Figure 5:
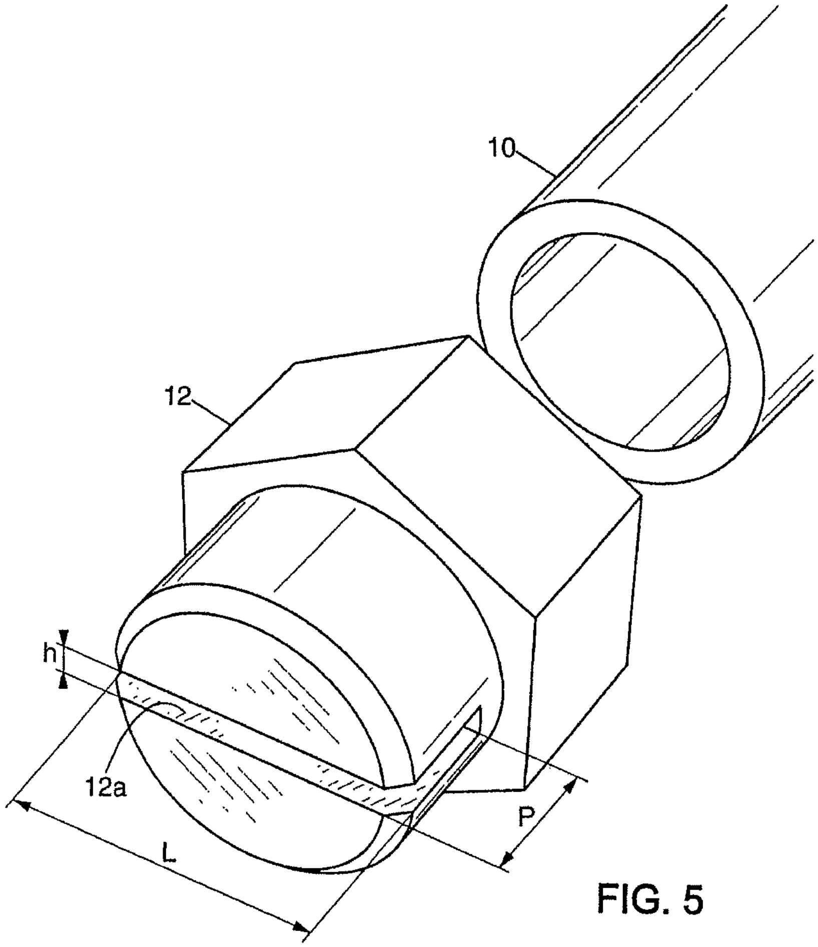
FIG. 5 is a view of the second pressure-reducing stage.

The second pressure-reducing stage 12 is depicted in FIG. 5. It is in the form of a tubular coupling open in its central part as far as a transverse wall which is pierced by a slot-shaped orifice 12*a*. The powder arriving at the exit of the nozzle 10 enters the hollow central part of the coupling 12 and then emerges into the slot 12*a* to create a substantially flat jet of powder leaving the nozzle. In order to obtain such a jet, the slot needs to have dimensions such that its depth P is greater than its height H. As a preference, the slot has a height H ranging between 1 and 4 mm, a depth ranging between 7 and 15 mm, and a width L ranging between 20 and 30 mm. Tests carried out on a slot with dimension H=2.5 mm, L=24 mm, P=10 mm yielded a substantially flat jet of powder with an angular spread of about 120°.

By virtue of the powder-spreading nozzle according to the invention, the device described is able to create a low-pressure flat jet that can be actuated using the air gun, and controlled, for uniform and homogeneous surface application of the powder (that is to say application with no sudden variations in flow rate) thus avoiding any dangerous splashing of chemicals as the powder comes into contact with the chemical spillage. The two pressure-reducing stages in succession are able to create pressure drops that play a part in lowering the pressure of the powder along its path, and allow the powder jet to be redirected in order to break it up and thus obtain, at the nozzle exit, a jet that is homogeneous, substantially uniform and flat, and of relatively low velocity. The two pressure-reducing stages 11 and 12 are able to reduce the powder outlet velocity. The reduction in pressure and the outlet velocity of the powder are dependent on the length of the nozzle and on the shape of the two pressure-reducing stages.

The invention claimed is:

1. A powder-spreading device comprising a sealed tank with a conical bottom, a vessel containing a pressurized spray gas and connected by a line to the volume of the tank, control means associated with said vessel and a powder-spreading nozzle connected to said tank, wherein said nozzle, of elongate shape, comprises a straight channel extending therein and at least two pressure-reducing stages able to break up the jet of powder emitted in order to form a uniform and homogeneous jet of relatively low velocity, the second stage being located near the free end of the elongate nozzle whereas the first stage is located on the opposite end of said elongate nozzle, wherein the first pressure-reducing stage of the nozzle provides the interface with the air gun and comprises a substantially tubular coupling of which the part intended to be inserted into said nozzle comprises a cylinder shape pierced with at least two holes in its main section and blanked off at its free end in order to force the powder to enter said nozzle via said holes.

2. The spreading device as claimed in claim 1, in which the nozzle is connected to the tank via tubing with the interposition of an air gun able to instigate the spreading of the powder.

3. The powder-spreading device as claimed in claim 2, in which the air gun comprises a first valve to allow the powder to pass through said air gun, and a control for controlling said first valve.

4. The spreading device as claimed in claim 1, in which the second pressure-reducing stage comprises a transverse wall pierced with a slot-shaped orifice.

5. The powder-spreading device as claimed in claim 1, in which the vessel containing the pressurized gas is located inside the sealed tank.

6. The powder-spreading device as claimed in claim 5, in which the sealed tank comprises an opening sealed off by a head bearing the control means.

7. The powder-spreading device as claimed in claim 6, in which the control means actuate an adjustable second valve located at the outlet of the vessel containing the pressurized spray gas.

8. The powder-spreading device as claimed in claim 7, in which the line runs between the adjustable second valve and the conical bottom of the sealed tank, and preferably said line extends as far as the middle of the conical bottom.

9. The powder-spreading device as claimed in one of claims 6 to 8, in which a siphon tube is positioned between the conical bottom of the sealed tank and the tubing, the connection between said siphon tube and said tubing being in the form of a tube insert located in the head.

10. The powder-spreading device as claimed in claim 1, wherein the nozzle is between 100 mm and 500 mm long.

11. The powder-spreading device as claimed in claim 10, wherein the nozzle is between 150 mm and 350 mm long.

12. The powder-spreading device as claimed in claim 10, wherein the nozzle has an internal diameter between 10 mm and 30 mm.

* * * * *